CHARLES RICH.

Improvement in Spring Beds or Bottoms.

No. 4,728. Reissued Jan. 30, 1872.

Witnesses.

W. C. Henderson

Edmund Masson

Charles Rich.

By atty A. B. Stoughton.

AM. PHOTO-LITHOGRAPHIC CO. N.Y. (OSBORNE'S PROCESS.)

UNITED STATES PATENT OFFICE.

CHARLES RICH, OF POUGHKEEPSIE, NEW YORK, ASSIGNOR TO METALLIC UNION-SPRING COMPANY, OF SAME PLACE.

IMPROVEMENT IN SPRING BED-BOTTOMS, SOFAS, AND CHAIR-SEATS.

Specification forming part of Letters Patent No. 116,529, dated June 27, 1871; reissue No. 4,728, dated January 30, 1872.

*To all whom it may concern:*

Be it known that I, CHARLES RICH, of Poughkeepsie, in the county of Dutchess and State of New York, have invented certain new and useful Improvements in Spring-Beds, Bed-Bottoms, Sofa and Chair Seats; and that the following is a full, clear, and exact description of the construction of the same, reference being had to the accompanying drawing making a part of this specification, in which—

Figure 1:
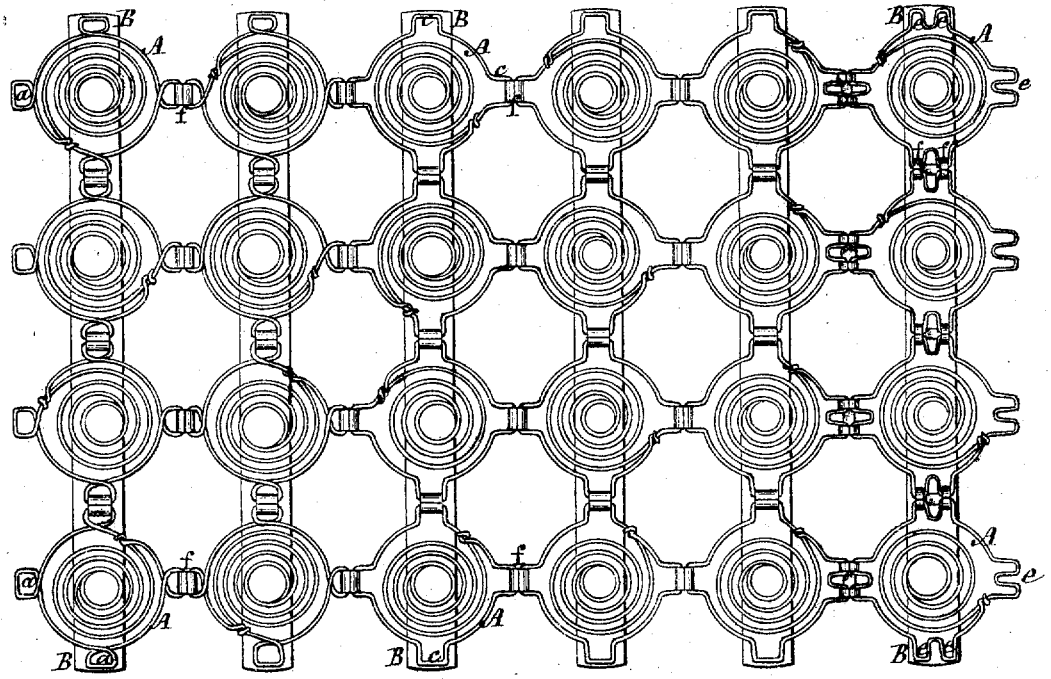
Figure 2:
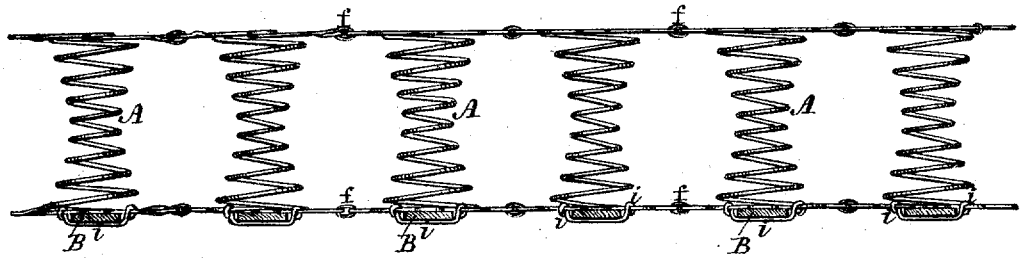

Figure 1 represents a top plan of spring bed or bed-bottom, and Fig. 2 represents a side elevation of the same.

Springs for beds have been made of varied forms, and with loops or eyes on the top and bottom of coils for receiving cords, straps, and clasps, and sometimes rigid frames, to hold the springs in proper position. Spring bed-bottoms have also been made of such springs so as to fold or roll up into compact form for easy transportation and handling; but, for such purpose, cords or straps alone have been used, as no form of rigid frame, however desirable such frame might be for keeping the springs in proper position, has heretofore been devised that would admit of folding or rolling up the bed or bed-bottom.

My invention consists in combining with springs that have eyes, loops, or bends of angular or curved form, on their top or bottom, or both top and bottom coils, rigid slats united to each other and to said slats by clasps, and so that such beds or bed-bottoms may be rolled or folded up.

To enable others skilled in the art to make and use my invention, I will proceed to describe the same with reference to the drawing.

A A A represent a series of springs, made of wire, the top and bottom coils of which have eyes *a*, loops *c*, and bends or corrugations *e* wrought in or on the wire itself, and into or over which clasps or couplings *f*, of metal, take to unite the series of springs into a bed-mattress or bed-bottom. B B B represent a series of slats, by preference made of wood, though any other suitable material may be used. The springs A are fastened to these slats by wire or other metal clasps *i* passing under or over the slats, and united to the coils of the springs at each side of one of said eyes, loops, bends, or corrugations, so that the wire or clasp will not slip; or the wire or clasp *i* may go over or around one of said eyes, loops, or bends, and through the slat, and thus hold both the springs and the slats in their proper positions. The springs, being thus looped or clasped to the slats and to each other, as shown, keep the structure in proper position, both longitudinally and laterally; and yet it may be rolled or folded up, the clasps between the slats serving as hinges to admit its flexure.

I have shown the slats as placed transversely of the bed or bed-bottom, and at the bottom only of the structure. If found necessary or essential, a series of slats may be used on top, parallel with those on the bottom; or the slats may be longitudinal instead of transverse ones, and a top-and-bottom series used, but parallel if the bed is to be capable of being rolled or folded up. If the slats run both ways they would make the structure rigid so far as the rolling or folding up is concerned.

Having thus fully described my invention, what I claim is—

The combination of a series of springs having eyes, loops, or bends formed in the wire itself, and in or on the top or bottom, or both top and bottom coils thereof, a series of wooden or other suitable slats, so united by clasps or links as that the structure may be rolled or folded up, as and for the purpose described.

CHARLES RICH.

Witnesses:
C. D. RICE,
W. H. H. YOUNG.